US010127215B2

(12) United States Patent
Siwoff et al.

(10) Patent No.: US 10,127,215 B2
(45) Date of Patent: Nov. 13, 2018

(54) SYSTEMS AND METHODS FOR DISPLAYING CONTEXTUAL REVISION HISTORY IN AN ELECTRONIC DOCUMENT

(71) Applicant: Google Inc., Mountain View, CA (US)

(72) Inventors: Kevin Siwoff, Astoria, NY (US); Ian Gunn, San Francisco, CA (US)

(73) Assignee: Google LLC, Mountain View, CA (US)

(*) Notice: Subject to any disclaimer, the term of this patent is extended or adjusted under 35 U.S.C. 154(b) by 30 days.

(21) Appl. No.: 15/155,887

(22) Filed: May 16, 2016

(65) Prior Publication Data
US 2016/0259769 A1 Sep. 8, 2016

Related U.S. Application Data

(63) Continuation of application No. 13/483,635, filed on May 30, 2012, now abandoned.

(51) Int. Cl.
G06F 17/30 (2006.01)
G06F 17/24 (2006.01)
G06F 17/22 (2006.01)
G06F 3/0482 (2013.01)
G06F 3/0484 (2013.01)
G06T 11/00 (2006.01)

(52) U.S. Cl.
CPC .......... *G06F 17/241* (2013.01); *G06F 3/0482* (2013.01); *G06F 3/04842* (2013.01); *G06F 3/04845* (2013.01); *G06F 17/2241* (2013.01); *G06F 17/2288* (2013.01); *G06T 11/001* (2013.01)

(58) Field of Classification Search
CPC .. G06F 17/2288; G06F 17/24; G06F 17/2247; G06F 17/212; G06F 17/30011; G06F 17/241

USPC ........................................................ 715/229
See application file for complete search history.

(56) References Cited

U.S. PATENT DOCUMENTS 5,761,669 A 6/1998 Montague et al.
6,061,697 A * 5/2000 Nakao ................. G06F 17/2247
707/999.003
6,243,706 B1 6/2001 Moreau et al.
6,327,584 B1 12/2001 Xian et al.
(Continued)

FOREIGN PATENT DOCUMENTS

JP 2006-146703 6/2006
JP 2006-163912 6/2006
(Continued)

OTHER PUBLICATIONS

International Search Report and Written Opinion for Application No. PCT/US2013/043290 dated Sep. 13, 2013.

*Primary Examiner* — Scott T Baderman
*Assistant Examiner* — Hassan Mrabi
(74) *Attorney, Agent, or Firm* — Lowenstein Sandler LLP

(57) ABSTRACT

A user may want to view the revision history of a particular section or context of an electronic document. The user selects a context by selecting a section of the electronic document in a document editing application. Based on the selected context, the application filters and displays only information about revisions associated with the selected section of the electronic document. The application omits information about revisions made to other unselected sections of the electronic document from display.

19 Claims, 12 Drawing Sheets

(56) References Cited

U.S. PATENT DOCUMENTS

| | | |
|---|---|---|
| 6,681,369 B2 | 1/2004 | Meunier et al. |
| 6,993,710 B1 | 1/2006 | Coad et al. |
| 7,031,954 B1 | 4/2006 | Kirsch |
| 7,035,910 B1 | 4/2006 | Dutta et al. |
| 7,140,536 B2 | 11/2006 | Barabe et al. |
| 7,260,773 B2 | 8/2007 | Zernik |
| 7,370,269 B1 | 5/2008 | Prabhu et al. |
| 7,529,778 B1 | 5/2009 | Dewey |
| 7,680,932 B2 | 3/2010 | Defaix et al. |
| 7,698,379 B2 | 4/2010 | Dutta et al. |
| 7,788,237 B2 | 8/2010 | Voronov et al. |
| 7,849,399 B2 | 12/2010 | Hoffman |
| 8,010,894 B2 | 8/2011 | Merrill et al. |
| 8,533,595 B2 | 9/2013 | Grossman et al. |
| 8,566,729 B2 | 10/2013 | Komine et al. |
| 9,031,382 B1 | 5/2015 | Kaiser et al. |
| 2002/0052920 A1 | 5/2002 | Umeki et al. |
| 2003/0217038 A1 | 11/2003 | Kageyama et al. |
| 2004/0133436 A1 | 7/2004 | Swain |
| 2004/0133444 A1 | 7/2004 | Defaix et al. |
| 2004/0215672 A1 | 10/2004 | Piftzner |
| 2004/0215825 A1 | 10/2004 | Piftzner |
| 2004/0215826 A1 | 10/2004 | Piftzner |
| 2004/0216090 A1 | 10/2004 | Kaler et al. |
| 2005/0091291 A1 | 4/2005 | Kaler et al. |
| 2005/0125461 A1 | 6/2005 | Filz |
| 2006/0064634 A1 | 3/2006 | Dettinger et al. |
| 2006/0101071 A1 | 5/2006 | Henderson |
| 2006/0149831 A1 | 7/2006 | Dutta et al. |
| 2006/0197764 A1 | 9/2006 | Yang |
| 2007/0033654 A1 | 2/2007 | Wilson |
| 2007/0220068 A1 | 9/2007 | Thompson et al. |
| 2007/0245243 A1 | 10/2007 | Lanza et al. |
| 2007/0260996 A1* | 11/2007 | Jakobson ............ G06F 17/2288 715/781 |
| 2007/0288637 A1 | 12/2007 | Layton et al. |
| 2008/0034327 A1 | 2/2008 | Cisler et al. |
| 2008/0172607 A1 | 7/2008 | Baer |
| 2008/0177782 A1 | 7/2008 | Poston et al. |
| 2008/0307017 A1 | 12/2008 | Lyons et al. |
| 2008/0307345 A1 | 12/2008 | Hart et al. |
| 2009/0235181 A1 | 9/2009 | Saliba et al. |
| 2009/0254529 A1 | 10/2009 | Goldentouch |
| 2010/0114916 A1* | 5/2010 | Cooke ............... G06F 17/30873 707/752 |
| 2010/0138394 A1 | 6/2010 | Hitz et al. |
| 2011/0055702 A1 | 3/2011 | Jakobson |
| 2011/0246869 A1 | 10/2011 | Vion-Dury |
| 2011/0252301 A1 | 10/2011 | Vollmer et al. |
| 2012/0005156 A1 | 1/2012 | Grant et al. |
| 2012/0016867 A1 | 1/2012 | Clemm et al. |
| 2012/0233137 A1* | 9/2012 | Jakobson ............ G06F 3/04847 707/695 |
| 2012/0271867 A1 | 10/2012 | Grossman et al. |
| 2012/0272153 A1 | 10/2012 | Grossman et al. |
| 2013/0174025 A1 | 7/2013 | Lee |
| 2013/0246901 A1 | 9/2013 | Massand |
| 2014/0149883 A1 | 5/2014 | Anand et al. |
| 2015/0135300 A1* | 5/2015 | Ford .................. H04L 67/1097 726/11 |

FOREIGN PATENT DOCUMENTS

| | | |
|---|---|---|
| JP | 2007-034782 | 2/2007 |
| KR | 10-2012-0035605 | 4/2012 |

* cited by examiner

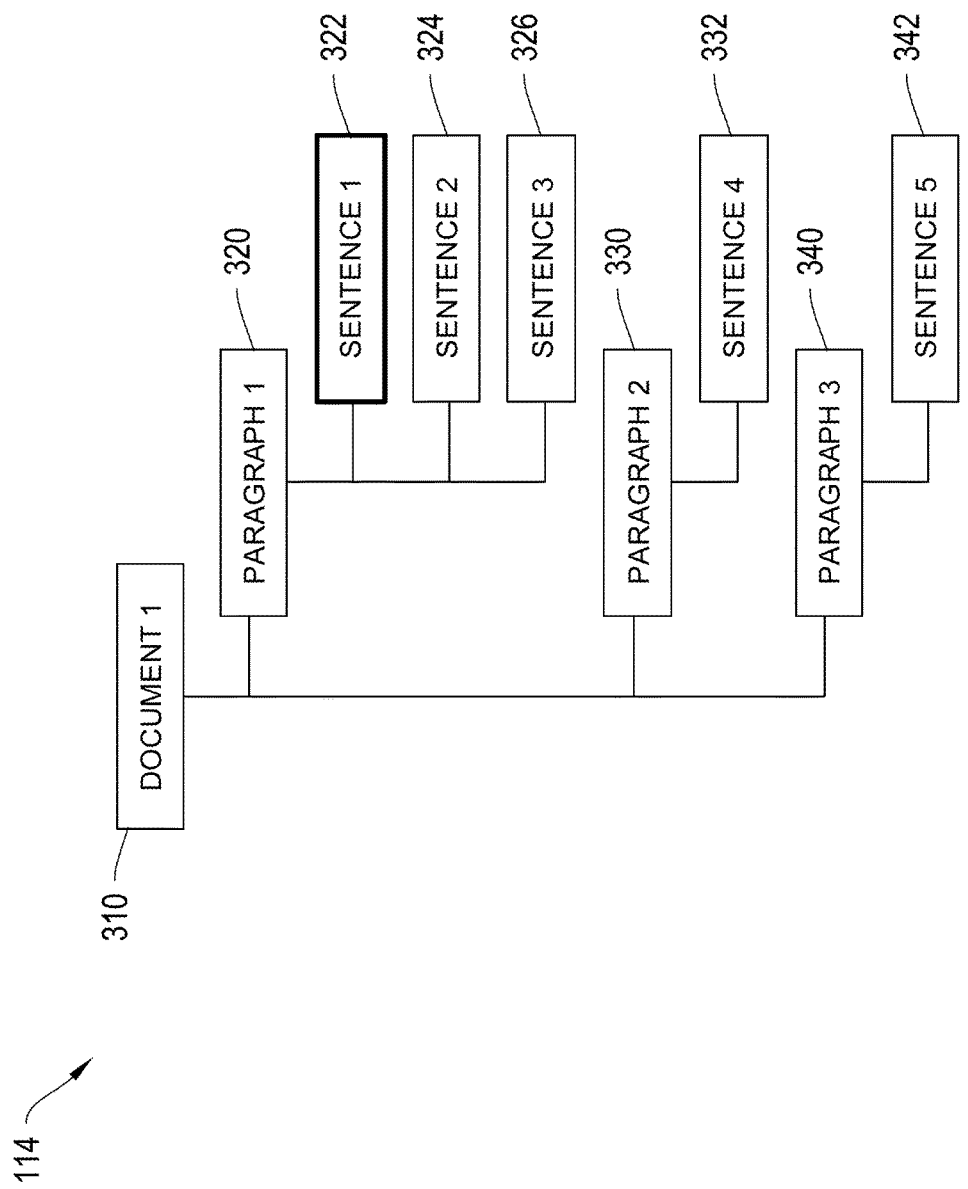

| DOCUMENT 1 REVISION TABLE 210 | | | |
|---|---|---|---|
| EDITOR | TIMESTAMP | CONTENT | CONTEXT |
| USER1 | 3/1/2012 08:45AM | Now we are engaged in | SENTENCE1 |
| USER2 | 3/2/2012 12:00PM | whether that nation | SENTENCE1 |
| USER1 | 3/10/2012 3:15PM | It is altogether fitting | SENTENCE4 |

| DOCUMENT 1 REVISION TABLE | | | |
|---|---|---|---|
| EDITOR | TIMESTAMP | CONTENT | CONTEXT |
| USER1 | 3/1/2012 08:45AM | Now we are engaged in | SENTENCE1 |
| USER2 | 3/2/2012 12:00PM | whether that nation | SENTENCE1 |
| USER1 | 3/10/2012 3:15PM | It is altogether fitting | SENTENCE4 |

FIG. 5C

SYSTEMS AND METHODS FOR DISPLAYING CONTEXTUAL REVISION HISTORY IN AN ELECTRONIC DOCUMENT

CROSS-REFERENCE(S)

This application is a continuation of co-pending U.S. patent application Ser. No. 13/483,635, filed on May 30, 2012, entitled "Systems And Methods For Displaying Contextual Revision History In An Electronic Document." The disclosure of the aforementioned application is expressly incorporated herein by reference.

FIELD

The systems and methods described herein generally relate to organizing, displaying, and managing revision history information associated with electronic documents, such as text documents, spreadsheets, presentations, multimedia files, or other types of documents.

BACKGROUND

The rapid advancement of networking and computer technology has allowed people to communicate and work together even if they are located in different parts of the world. Often, multiple editors may need to collaboratively create and edit a shared common electronic document. Because multiple editors may make many revisions to the document over a long period of time, existing document editing applications often assist a user in managing the revision history information of the document. For example, some document editing applications maintain and display a complete list of revisions made to the document for viewing by a user. Each revision in the list of revisions may include information about the name of the editor who made the revision, the time that the revision was made, and the content of revision.

Unfortunately, in many situations, it is not desirable for a document editing application to display a complete list of revisions made to a document because it may result in information overload. For example, if a document editing application must display a very long list of revisions, a user may have difficulty visually determining how a particular revision affected a particular section of the document. Similarly, the user may have difficulty determining the identity of the editor of a particular revision or set of revisions. In addition, the user may have difficulty viewing only the revisions made to a particular section of the document.

SUMMARY

Thus, systems and methods are disclosed that allow a user to easily view only a subset of the revisions made to a document based on a context selected by the user. A context refers to any subset of the document, such as a word, an image, a phrase, a sentence, a paragraph, or other portion of the document.

The user selects a context by selecting a section of the electronic document in a document editing application. The context is used to change the behavior of the application, such as changing the specific revision history information that is displayed by the application. Using the selected context as input, the application filters and displays only information about revisions associated with the selected section of the electronic document. The application omits information about revisions made to other unselected sections of the electronic document from display.

According to one aspect, the present disclosure relates to a method of presenting revision history information of an electronic document. The method includes detecting a selection of a section of the electronic document by a user. In response to detecting the selection of the section of the electronic document, first menu is displayed having a command to display a subset of the revision history information of the electronic document. The subset includes revision history information corresponding to the selected section of the electronic document and omits revision history information unassociated with the selected section of the electronic document. The method further includes detecting a selection by the user of the command to display the subset of the revision history information of the electronic document. In response to detecting the selection by the user of the command to display the subset of the revision history information of the electronic document, a list is displayed via a second menu. The list has a revision entry associated with a revision to the selected section of the electronic document. The revision entry includes identification information identifying an editor having made the revision to the selected section of the electronic document, and timestamp information indicating the time that the revision was made.

In some embodiments, the identification information includes a name corresponding to the editor and an image corresponding to the editor. In some embodiments, the identification information is displayed in a color associated with the editor. In some embodiments, the method includes displaying, in the electronic document, text corresponding to the revision entry in the color associated with the editor identified in the revision entry. In some embodiments, the displaying text includes displaying text added to the electronic document and not displaying text removed from the electronic document. In some embodiments, the method includes displaying, in a vertical margin of a visual display of the electronic document, a vertical line having a segment. A first end of the segment is aligned vertically with a beginning of the text corresponding to the revision entry. A second end of the segment is aligned vertically with an end of the text, and the segment is displayed in the color of the text. In some embodiments, the first end of the segment comprises a user interface configured to be selected by the user. In some embodiments, the method includes detecting a selection by the user of the first end of the segment. In response to detecting the selection of the first end of the segment, the revision entry is displayed next to the first end of the segment.

According to another aspect, the present disclosure relates to a system for presenting revision history information of an electronic document. The system includes an electronic document editing application. The application includes a model process for managing application data associated with the electronic document and a context revision history process for receiving commands from a user. The context revision history process is configured to detect a selection of a section of the electronic document by a user. The application also includes a revision database for storing revision history information of the electronic document and a view process for displaying the electronic document in a visual display. The view process is configured to display a menu including a list having a revision entry associated with a revision to the selected section of the electronic document. The revision entry is retrieved from the revision database, and the revision entry includes identification information identifying an editor having made the revision to the selected section of the electronic document. The revision entry also includes timestamp information indicating the time that the revision was made.

In some embodiments, the identification information includes a name corresponding to the editor and an image corresponding to the editor. In some embodiments, the identification information is displayed in a color associated with the editor. In some embodiments, the view process is further configured to display text corresponding to the revision entry in the color associated with the editor identified in the revision entry. In some embodiments, the view process is further configured to display text added to the electronic document and not text removed from the electronic document. In some embodiments, the view process is further configured to display, in a vertical margin of a visual display of the electronic document, a vertical line comprising a segment. A first end of the segment is aligned vertically with a beginning of the text corresponding to the revision entry. A second end of the segment is aligned vertically with an end of the text, and the segment is displayed in the color of the text. In some embodiments, the first end of the segment comprises a user interface element configured to be selectable by the user. In some embodiments, the controller process is further configured to detect a selection by the user via the controller logic of the first end of the segment. In response to detecting the selection of the first end of the segment, the view process is configured to display the revision entry next to the first end of the segment.

BRIEF DESCRIPTION OF THE DRAWINGS

Further features of the present disclosure, its nature and various advantages, will be apparent upon consideration of the following detailed description, taken in conjunction with the accompanying drawings, in which like reference characters refer to like parts throughout, and in which:

FIG. 4B shows the document model of FIGS. 1 and 3, according to an embodiment;

FIG. 4C shows the revision table of FIG. 2, according to an embodiment;

FIG. 5C shows in more detail the revision table 210 of FIG. 2 in operation with the screenshot of FIG. 5A, according to an embodiment;

DESCRIPTION OF CERTAIN EMBODIMENTS

To provide an overall understanding of the systems and methods described herein, certain implementations will now be described, including systems and methods for displaying contextual revision history. However, it will be understood by one of ordinary skill in the art that the systems and methods described herein may be adapted and modified as is appropriate for the application being addressed. For example, the systems and methods described herein may be adapted for other uses, such as for displaying the revision history of portions of a picture, a sound clip, a movie clip, or an email thread. Similarly, the systems and methods described herein may be adapted for other platforms such as online web applications (e.g. Google Documents), mobile devices such as smartphones or tablets, or collaborative web frameworks such as a wiki. Thus, the systems and methods described herein may be employed in other suitable applications, and that such other additions and modifications will not depart from the scope thereof.

Figure 1:
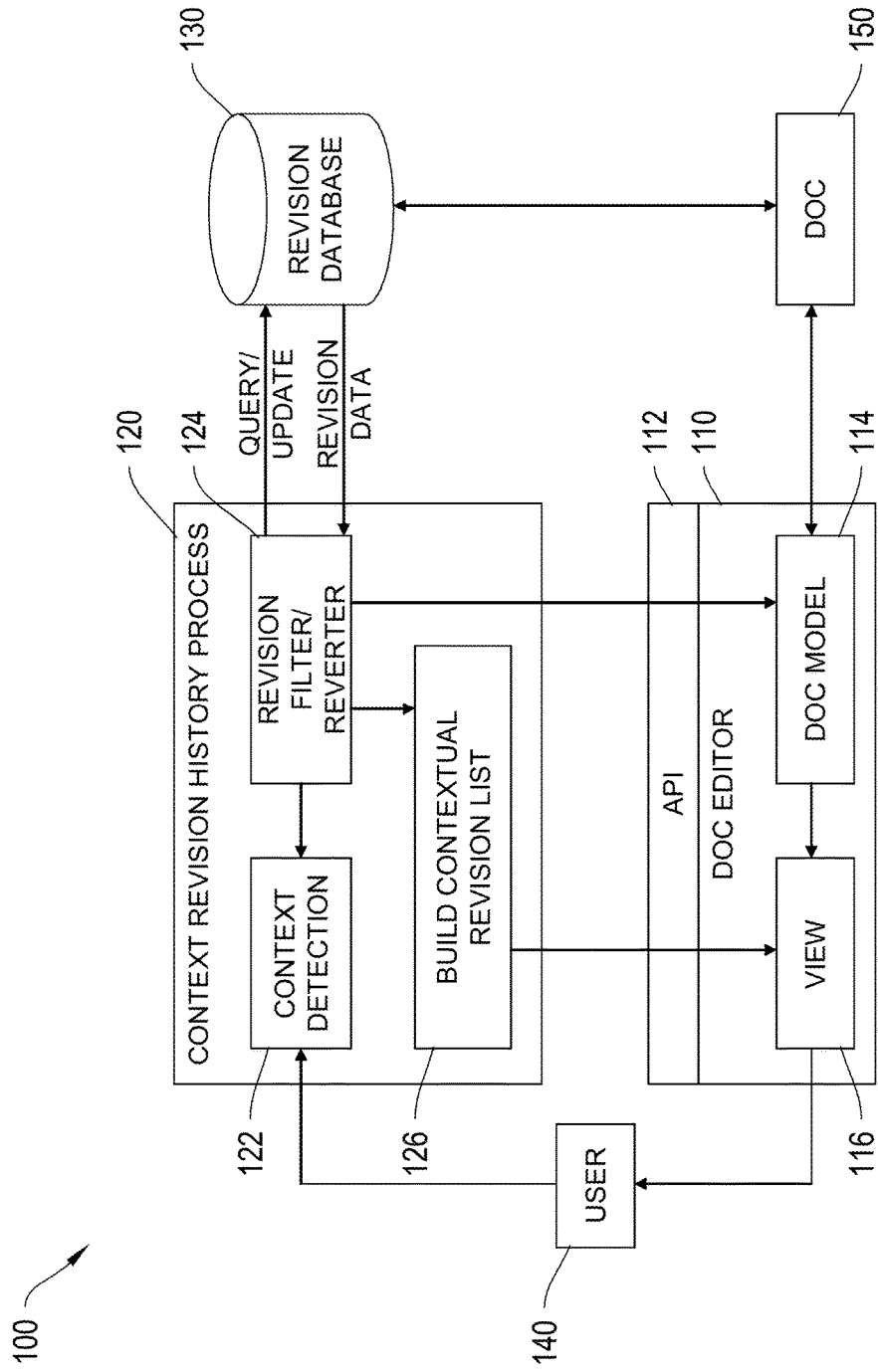
FIG. 1 shows an illustrative system for providing and displaying contextual revision history, according to an embodiment.

FIG. 1 shows an illustrative system for providing and displaying contextual revision history, according to an embodiment. A system 100 includes a document editor 110, a context revision history process 120, a revision database 130, a user 140, and an electronic document 150. The document editor 110 includes an application programming interface (API) 112, a document model 114, and a view component 116. The context revision history process 120 includes a context detector 122, a revision filter/reverter 124, and a revision list builder 126. As described in detail further below, the system 100 allows the user 140 to view the revision history of the electronic document 150, which is being edited and/or viewed in the document editor 110. In particular, the user 140 selects a context, such as a sentence or a paragraph, within the document 150 in order to view revision history information corresponding only to the selected context within the document 150.

The document editor 110 may be any type of electronic document editing or viewing application, such as a text editor, a spreadsheet application, an email application, or an integrated development environment (IDE) program. The depicted document editor 110 includes an application programming interface (API) 112, a document model 114, and a view component 116.

The API 112 provides an interface for the context revision history process 120 to interact with and send commands to the document editor 110. For example, the API 112 may provide functions that may be called by the context revision history process 120 to send commands to the document model 114 and the view component 116.

The document model 114 is a data structure that contains one or more structured data sets representing the data stored in the document 150. The document editor 110 generates the document model 114 from the data stored in the document 150 when it loads the document 150 into memory. The document model 114 stores data and metadata associated with the document 150. This data and metadata may include information such as text, formatting, images, sound, and authorship information. For example, the document model 114 may store the data and metadata associated with the document 150 inside a markup language tree structure such as an Extensible Markup Language (XML) Document Object Model (DOM). The systems and methods disclosed herein do not depend on any particular implementation of the document model 114, and any suitable document model may be employed.

The view component 116 renders the data stored in the document model 114 to a screen, such as a computer monitor, for viewing by the user 140. Thus, the view component 116 may display the document 150 in an interactive editor for viewing and editing by the user. For example, the view component 116 may be a canonical document display process. The view component 116 may provide a What You See Is What You Get (WYSIWYG) graphical user interface that displays the formatted text of the document 150 as an editable document.

The depicted context revision history process 120 includes a context detector 122, a revision filter/reverter 124, and a revision list builder 126. The context revision history process 120 detects the selection of a context within the document 150 by the user 140 and provides the view component 116 with a filtered list of revisions made to that context of the document 150 for display to the user 140. The context detector 122 detects the selection of a context within the document 150 by the user 140. A context is a subset of the text in the document 150, such as a particular portion or section of the text of the document 150. For example, a subset of the text could be a particular word, sentence, or paragraph in the text of the document 150. A subset of the text may also be a particular part of a sentence, a particular part of a paragraph, a particular set of multiple paragraphs, or particular parts of multiple paragraphs. The subset does not need to be continuous and may include, for example, sentences from different paragraphs of the text. Thus, a context represents a subset of the whole text of the document 150.

In the system 100, the revision history information of the document 150 is represented as a list of revision entries. Each revision entry in the list is associated with a revision to the document 150. Thus, the revision history information of a particular context of the document 150 is represented as a list of revision entries associated with revisions to that particular context.

The context detector 122 detects the selection of a context by looking and responding to certain actions taken by the user 140. For example, the user 140 may use an input device such as a mouse to select a section of text in the document 150, open a menu, and select a command in the menu to the context revision history process 120 to display revisions made to the selected section of text. The context detector 122 may include a listener process that specifically looks for and detects the selection of text by the user 140.

After the context detector 122 has detected the selection of a context, the revision filter/reverter 124 uses the selected context to obtain a subset of the revision history information of the document 150 from the revision database 130. The subset of the revision history information includes revision history information corresponding to the selected context and omits revision history information unassociated with the selected context. For example, the selected context may be a particular sentence within the document 150. In this example, the revision filter/reverter 124 queries the revision database 130 for revisions made to that sentence within the document 150. In response, the revision database 130 returns revision data pertaining to the revisions made to that sentence within the document 150.

After the revision filter/reverter 124 has received the subset of the revision history information corresponding to the selected context, the revision list builder 126 uses the subset to build a list of revision entries corresponding to the selected context. Each revision entry in the list is associated with a revision made to the selected context. For example, each revision entry may include identification information identifying the editor who made the revision, timestamp information corresponding to the time that the revision was made, and the content of the revision. The identification information may include a name or username and an image associated with the editor.

After the revision list builder 126 builds the list of revision entries corresponding to the selected context, the view component 116 displays the list to the user 140 via a display, such as a computer monitor or other visual interface.

In some embodiments, the revision filter/reverter 124 allows the user 140 to revert or "undo" a revision made to the selected context. For example, the user 140 may choose a revision entry in the list of revision entries constructed by the revision list builder 126. The user 140 may issue a command to the contextual revision history process 120 to revert the revision associated with the chosen revision entry. In response, the revision filter/reverter 124 updates the revision database 130 to undo that revision in the document 150.

In some embodiments, the system 100 may be implemented in a computer system. For example, the document editor 110, the context revision history process 120, and the revision database 130 may be implemented as separate software applications on the computer system or as one integrated software application. In some embodiments, the document editor 110 and the context revision history process 120 may be implemented on a server and provided to the user 140 over the internet via a web browser. The revision database 130 may also be implemented on a server separate from the document editor 110 and the context revision history process 120. The revision database 130 may be distributed among multiple servers over the internet.

Figure 2:
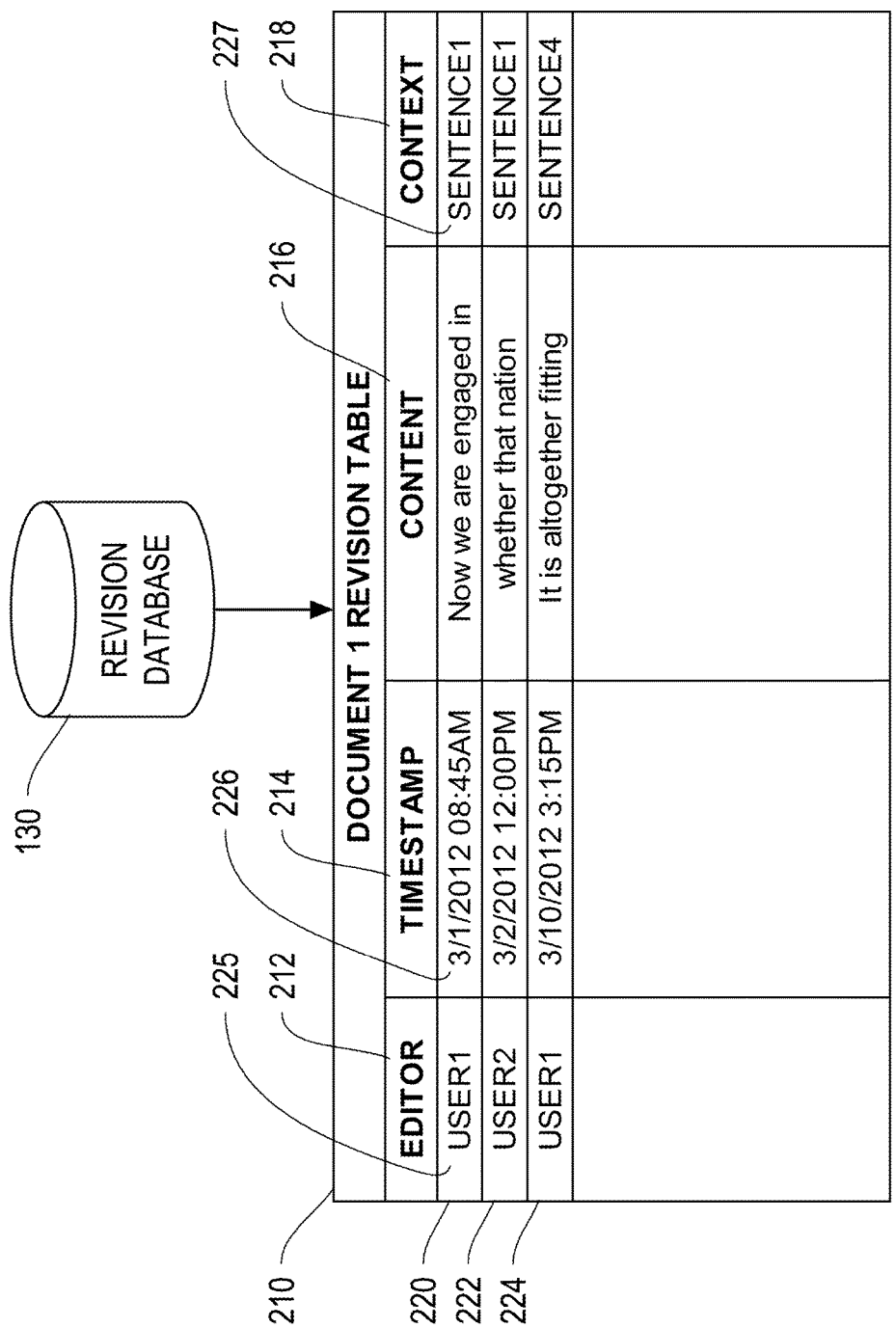
FIG. 2 shows in more detail the revision database of FIG. 1, according to an embodiment.

FIG. 2 shows in detail the revision database 130 of FIG. 1, according to an embodiment. The revision database 130 may be a flat file, an SQL database or other type of relational database or distributed database suitable for storing revision history information. The revision database 130 includes a revision table 210. The revision table 210 stores the revision history information of the document 150 of FIG. 1. The revision table 210 includes an editor column 212, a timestamp column 214, a content column 216, and a context column 218. The revision table 210 also includes a number of revision entry rows, such as revision entry rows 220, 222, and 224. Each revision of the document 150 is represented by a revision entry row in the revision table 210. For a revision entry row, such as the revision entry row 220, the editor column 212 contains information identifying the editor who made the revision, and the timestamp column 214 contains timestamp information indicating the time that the revision was made. Similarly, the content column 216 contains information about the content of the revision, such as the text that was added or removed or the formatting information that was changed. The context column 218 contains information about the context that the revision corresponds to. For example, in FIG. 2, the revision entry row 220 represents a revision made by a user "User1" (225) at 8:45 am on 3/1/2012 (226) associated with a context named "Sentence1" (227). The following discussion of FIG. 3 will explain how the context is mapped to the underlying electronic document and document model.

Figure 3:
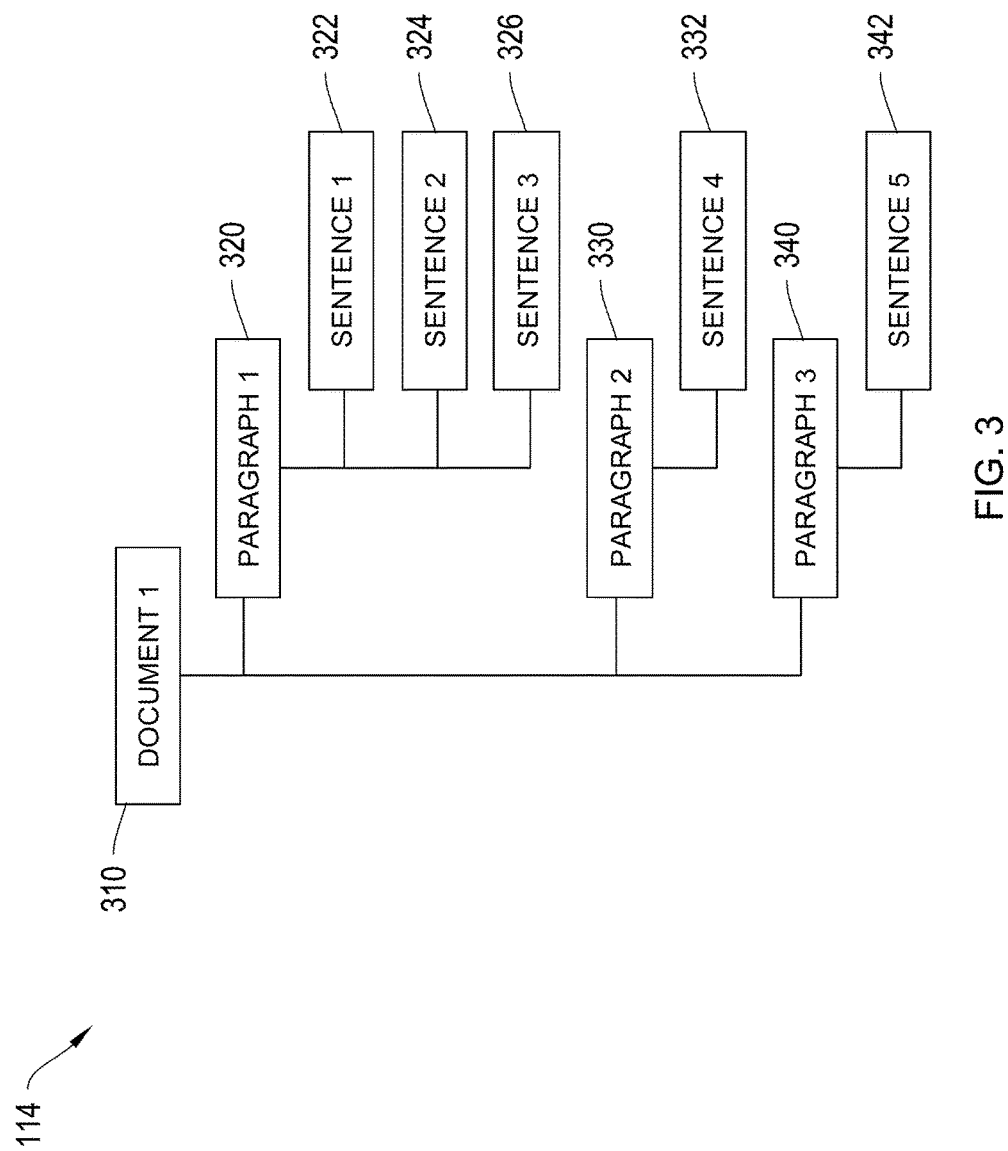
FIG. 3 shows in more detail the document model 114 of FIG. 1, according to an embodiment.

FIG. 3 shows in more detail a graphical depiction of the document model 114 of FIG. 1, according to an embodiment. The depicted document model 114 is represents the document 150 as a hierarchical tree structure containing a root document node 310, paragraph nodes 320, 330, and 340, and sentence nodes 322, 324, 326, 332, and 342. For example, the hierarchical tree structure may be an XML DOM structure commonly used for web applications.

Each node corresponds to a section of the document 150. For example, the paragraph nodes 320, 330, and 340 correspond to a first, a second, and a third text paragraph in the document 150. The paragraph node 320 has three children nodes—the sentence nodes 322, 324, and 326, which correspond to a first, a second, and a third sentence in the first paragraph. The paragraph node 330 has one child node—the sentence node 332, which corresponds to a sentence in the second paragraph, and the paragraph node 342 has one child node—the sentence node 342, which corresponds to a sentence in the third paragraph. The discussion of FIGS. 4A and 4B below will illustrate how the nodes map to the text of the document 150.

Each node also contains information associated with its corresponding section of the document 150. The information may include data regarding the font style, font size, formatting, and textual content of the corresponding section of the document 150. For example, the paragraph node 320 may contain formatting and font information regarding the first paragraph in the document 150. Similarly, the sentence node 322 may contain the text of the sentence that it corresponds to. Each node also has a label or name for identifying itself. For example, the paragraph node 320 has the name "Paragraph1," and the sentence node 322 has the name "Sentence1."

The hierarchical tree of nodes in the document model 114 provides a way to structurally divide the document 150 into sections. Because a node corresponds to a section of the document 150, a node may represent a section, and thus a context within the document 150. Each revision to the document 150 is associated with a node to identify the context that the revision is associated with. For example, turning back to FIG. 2, the revision entry row 220 is associated with a context "Sentence1," which corresponds to the sentence node 322. Accordingly, the revision represented by revision entry row 220 may be mapped to a particular section of the document 150 as represented by the sentence node 322 in the document model 114.

The hierarchical structure of the document model 114 in FIG. 3 is explained by way of example only. The document model 114 may be divided into different types of subsections without departing from the principles of the present disclosure. In addition, the document model 114 is represented as a tree structure by way of example only. Any suitable data structure known in the art may be used to represent the document model 114.

Figure 4A:
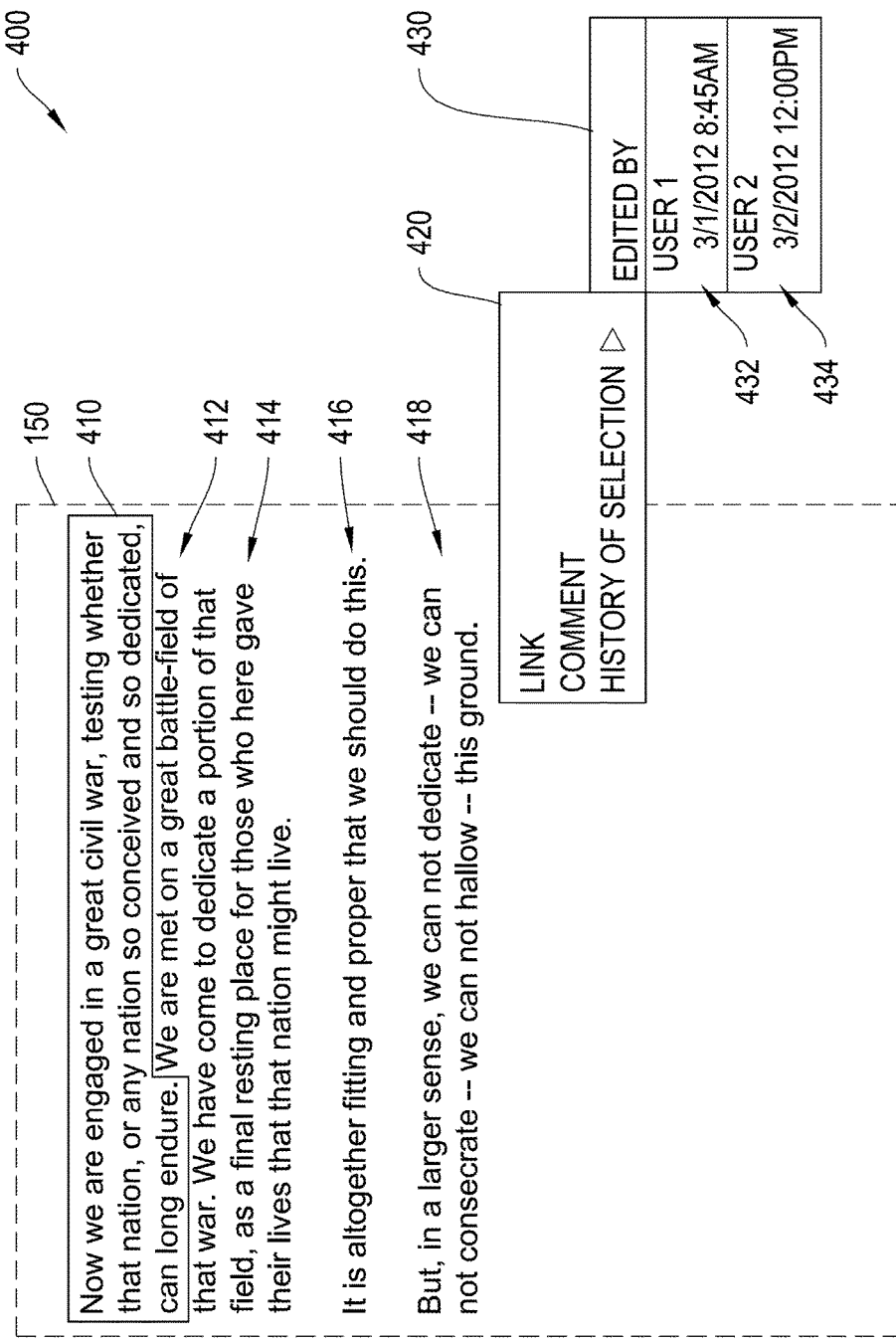
FIG. 4A shows an illustrative screenshot of the system of FIG. 1, according to an embodiment.

FIGS. 4A, 4B, and 4C illustrate the presentation of revision history information of an electronic document in the system 100 of FIG. 1, according to an embodiment. FIG. 4A shows an illustrative screenshot 400 containing sentence 410, a command menu 420, and a revision history menu 430. The revision history menu 430 contains a revision entry 432 and a revision entry 434. FIG. 4B shows another view of the document model 114 of FIGS. 1 and 3, according to an embodiment. FIG. 4C shows the revision table 210 of FIG. 2, according to an embodiment.

In FIG. 4A, the screenshot 400 shows a view of the depicted document 150 of FIG. 1. As seen in the screenshot 400, the document 150 contains a first paragraph containing sentences 410, 412, and 414, a second paragraph containing a sentence 416, and a third paragraph containing a sentence 418. A user, such as the user 140 of FIG. 1, selects the sentence 410 with a mouse and opens the command menu 420. For example, the command menu 140 may be opened by right clicking on the selected sentence 410 with the mouse. The command menu 140 contains a command to display a subset of the revision history information of the electronic document corresponding to the selected context. In FIG. 4A, the user 140 selects the command "History of Selection" to view the revisions made to the selected sentence 410.

In response to the user 140's selection of the command, the context detector 122 of FIG. 1 detects the context selected by the user 140 by identifying the appropriate node or nodes in the document model 114 that corresponds to the selected sentence 410. As shown in FIG. 4B, the sentences in FIG. 4A correspond to the nodes in FIG. 4B. For example, the sentence nodes 322, 324, and 325 correspond to the sentences 410, 412, and 414 respectively. Similarly, the sentence nodes 330 and 340 correspond to the sentences 416 and 418 respectively. As shown in FIG. 4B, the context detector 122 determines that the selected sentence 410 corresponds to the sentence node 322 in the document model 114. Turning back to FIG. 1, the context detector 122 instructs the revision filter/reverter 124 to search the revision database 130 for revisions corresponding to a context represented by the sentence node 322.

FIG. 4C shows the revision table 210 stored in the revision database 130 of FIGS. 1 and 2. The revision filter/reverter 124 queries the revision database 130 for revision entry rows in the revision table 210 that match the context represented by the sentence node 322. The sentence node 322 has the name "Sentence1," so the revision database 130 searches the revision table 210 for any revision entry rows that match the value "Sentence1" under the context column 218. As seen in FIG. 4C, the revision entry row 220 and the revision entry row 222 match the value "Sentence1" under the context column 218. Accordingly, in response to the query made by the revision filter/reverter 124, the revision database 130 will return the revision data in the revision entry rows 220 and 222 to the revision filter/reverter 124, as shown in FIG. 1.

After the revision filter/reverter 124 receives the revision data in the revision entry rows 220 and 222, it communicates the revision data to the revision list builder 126, as shown in FIG. 1. The revision list builder 126 constructs a list containing two revision entries sorted in chronological order by timestamp information. Thus, the first revision entry corresponds to the revision entry row 220, and the second revision entry corresponds to the revision entry row 222. The revision list builder 126 transmits the list of revision entries to the view component 116 in the document editor 110. The view component 116 renders the list of revision entries for display to the user 140 to provide a response to the user 140's command to view the revisions made to the selected sentence 410. As seen in FIG. 4A, the revision history menu 430 displays the list of revision entries. The revision entry 432 displays the information in the revision entry row 220 in order to tell the user 140 that the selected sentence 410 was edited by an editor with the username "User1" at 3/1/122012 at 8:45 am. Similarly, the revision entry displays the information in the revision entry row 222 to tell the user 140 that the selected sentence 410 was also edited by another editor with the username "User2" at 3/2/2012 at 12:00 pm.

As depicted in FIGS. 4A, 4B, and 4C, the system 100 presents to a user revisions made to a particular section of an electronic document based on a context selected by the user. In addition to selecting a single sentence, the user 140 may optimally select any subset of the text in the document 150, including any portion of a sentence or group of sentences or any portion of a paragraph or group of paragraphs.

In some embodiments, each different editor in the revision history menu 430 may be associated with a different color. Revisions in the selected sentence 410 made by a particular editor may be displayed in the editor's associated color to assist the user 140 in distinguishing between revisions made by different editors. For example, the editor "User1" may be associated with the color green, and the editor "User2" may be associated with the color blue. Thus, the portions of the selected sentence 410 edited by "User1" may be displayed in green, and the portions of the selected sentence 410 edited by "User2" may be displayed in blue.

In some embodiments, the user 140 may select a revision entry in the revision history menu 430 and send a command to the contextual revision history process 120 to revert the revision associated with the revision entry. For example, the user 140 may choose the revision entry 432 and send a command to the revision filter/reverter 124 to revert the revision associated with the revision entry 432. In response, the revision filter/reverter 124 may send a command to the revision table 210 to remove the revision entry row 220, which corresponds to the revision entry 432. In addition, the document 150 may be updated to remove the changes introduced in the revision associated with the revision entry 432.

Figure 5A:
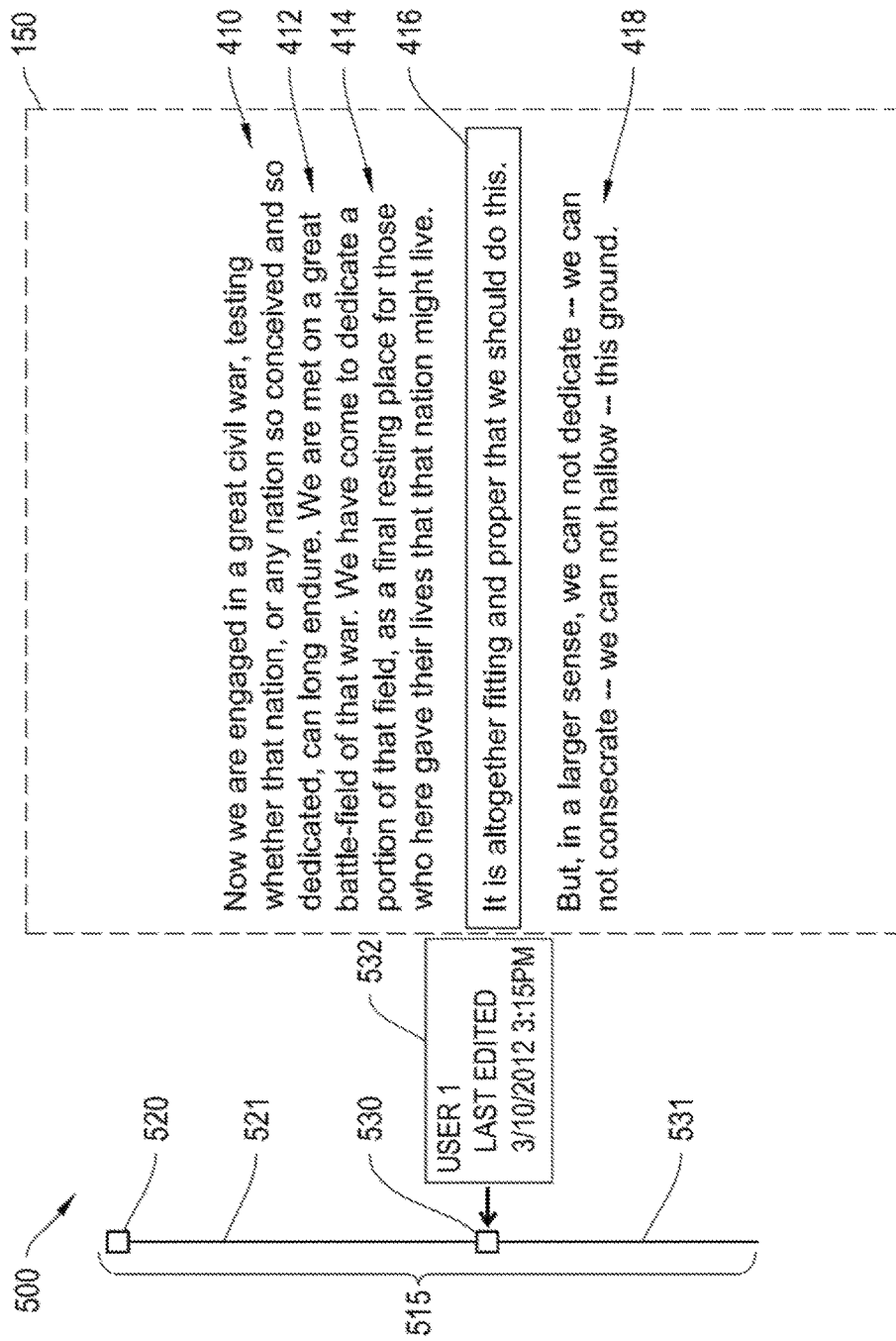
FIG. 5A is a pictorial representation of a display screen of the system of FIG. 1, according to an embodiment.
Figure 5B:
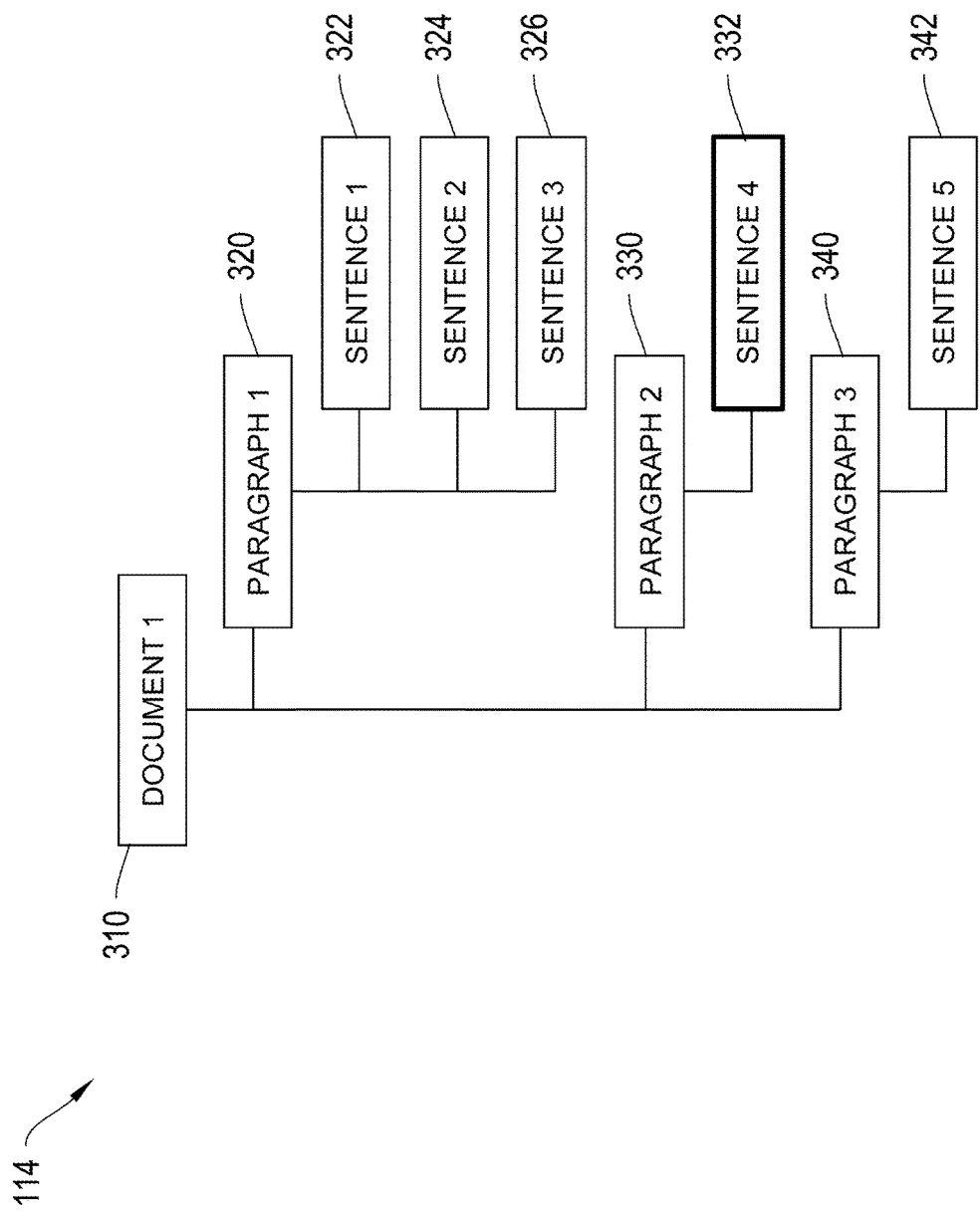
FIG. 5B shows another view of the document model of FIGS. 1 and 3, according to an embodiment.

FIGS. 5A, 5B, and 5C illustrate the presentation of revision history information of an electronic document in the system 100 of FIG. 1 using a revision history bar, according to an embodiment. FIG. 5A shows an illustrative screenshot 500 containing sentences 410, 412, 414, 416, and 418, a revision history bar 515 containing revision line segments 521 and 531 and user interface elements 520 and 530, and a revision entry 532. FIG. 5B shows another view of the document model 114 of FIGS. 1 and 3, according to an embodiment. FIG. 5C shows the revision table 210 of FIG. 2, according to an embodiment.

In FIG. 5A, the screenshot 500 shows a view of the document 150 of FIG. 1. As seen in the screenshot 500 and as discussed previously, the document 150 contains a first paragraph containing the sentences 410, 412, and 414, a second paragraph containing the sentence 416, and a third paragraph containing the sentence 418. The screenshot 500 also shows a revision history bar 515. The revision history bar 515 is a user interface element implemented as a fixed vertical line in the margin of the screenshot 500 containing the revision line segments 521 and 531. The revision history bar 515 provides an unobtrusive way to show how the revisions made to the document 150 line up with the text of the document 150. Thus, the revision history bar 515 provides dynamic, unobtrusive access to revision history information of the document 150.

To show how the revisions made to the document 150 line up with the text of the document 150, the revision history bar 515 contains the revision line segments 521 and 531. The revision line segments 521 and 531 correspond to different contexts within the document 150 that contain revisions, and the revision line segments 521 and 531 align vertically with those contexts. For example, the revision line segment 521 corresponds to the first paragraph of the document 150. As seen in FIG. 5A, the revision line segment 521 aligns vertically with the first paragraph of the document 150 so that the top end of the revision line segment 521 aligns vertically with the beginning of the paragraph, and the bottom end of the revision line segment 521 aligns vertically with the end of the paragraph. The first paragraph of the document 150 corresponds to the "Paragraph1" context, as shown in FIG. 5B. Thus the first paragraph of the document 150 has two associated revisions in the "Sentence1" context as seen in FIGS. 5B and 5C. Similarly, the revision line segment 531 corresponds to the second paragraph of the document 150 (i.e. the "Paragraph2" context).

Each revision line segment contains a user interface element at the top end of the revision line segment. As shown in FIG. 5A, the revision line segment 521 contains the user interface element 520, and the revision line segment 531 contains the user interface element 530. The user interface elements 520 and 530 may be buttons or any other suitable user interface element. When the user 140 interacts with a user interface element, the revision entry 532 provides the user 140 with revision history information corresponding to the context associated with the revision line segment containing that user interface element. For example, when the user 140 interacts (i.e. clicks or hovers over with a mouse pointer) with the user interface element 530, the revision entry 532 provides the user with revision history information corresponding to the context associated with the revision line segment 531, which contains the user interface element 530. In this example, the revision line segment 531 is associated with the "Paragraph2" context. Following the steps similar to those described previously, the context detector 122 determines that that the selected context is the paragraph node 320 shown in FIG. 5B. The context detector 122 determines that the paragraph node 320 has only one child node, i.e. the sentence node 322 (the "Sentence4" context). Thus, the revision filter/reverter 124 queries the revision database 130 for revision entry rows that correspond to the "Sentence4" context. The revision database 130 will return the revision data in the revision entry row 224, which corresponds to the "Sentence4" context, as shown in FIG. 5C. The build context revision list component 124 will construct a list containing one revision entry (i.e. the revision entry 532) and instruct the view component 116 to display the list to the user 140. Accordingly, the revision entry 532 is displayed next to the user interface element 530 inside a window, a tooltip, or some other suitable user interface element. The revision entry 532 provides the user 140 with information relating to the revision made by the editor "User1" at 3/10/2012 at 3:15 pm to the sentence 416.

Figure 6:
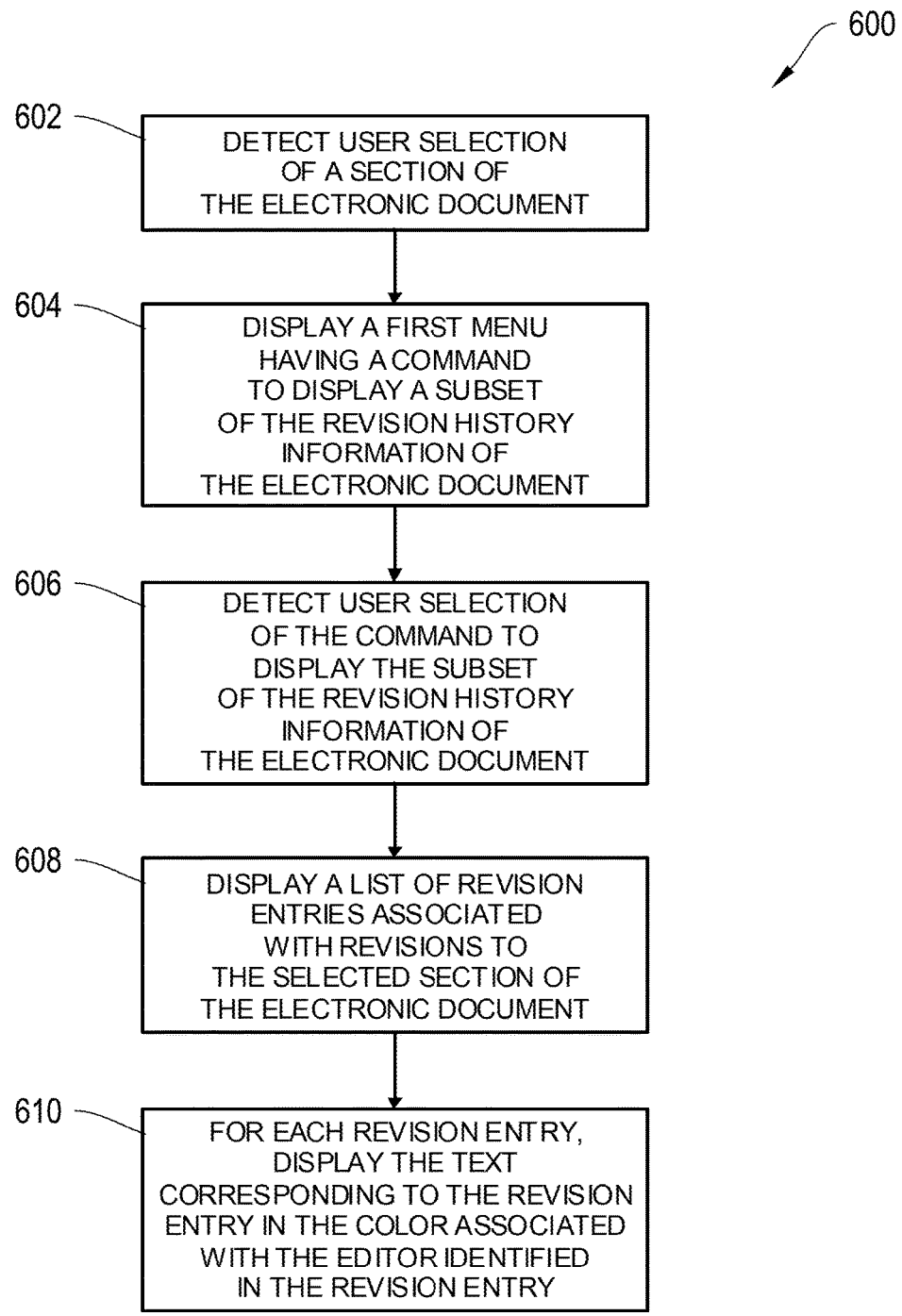
FIG. 6 shows an illustrative process for displaying the revision history information of a section of an electronic document based on the selection of a section or context, according to an embodiment.

FIG. 6 shows an illustrative process for showing the revision history information of a section of an electronic document based on the selection of a section or context. A process 600 may be performed by a system such as the system 100 of FIG. 1. In order to provide a clear explanation, the process 600 will be described in relation to the system 100 by way of example. The process 600 begins with a step 602. At the step 602, the context detector 122, detects the selection of a section of the electronic document 150 by the user 140. For example, the user 140 may select any subset of the document 150, such as a word, a phrase, a sentence or a paragraph, a portion thereof, etc. As shown in FIGS. 4A and 5A, the selection section may be the sentence 410 or the sentence 416.

At step 604, in response to detecting the selection of the section of the document 150, the view component 116 displays a first menu having a command to display a subset of the revision history information of the document 150. For example, in FIG. 4A, the first menu is the command menu 420. The command to display the subset of the revision history information of the document 150 is the command labeled "History of Selection" in the command menu 420.

At step 606, the context detector 122 detects the user selection of the command to display the subset of the revision history information of the electronic document. For example, turning back to FIG. 4A, the user selection of the "History of Selection" command is the user 140's clicking or hovering over the "History of Selection" command with a mouse pointer. As described in detail previously, in response to the detection of the user selection of the command, the revision filter/reverter 124 queries the revision database 130 to obtain revision data corresponding to the selected section. The revision list builder 126 constructs a list of revision entries from the revision data obtained from the revision database 130. The revision list builder 126 sends the list of revision entries to the view component 116 for display.

At step 608, in response to detecting the selection by the user 140 of the command to display the subset of the revision history information of the document 150, the view component 116 displays via a second menu the list of revision entries associated with revisions to the selected section of the document 150. A revision entry may be associated with a revision to the selected section of the document 150. For example, in FIG. 4A, the list of revision entries is shown visually as the revision history menu 430, which contains the revision entry 432 and the revision entry 434. A revision entry includes identification information identifying an editor having made the revision to the selected section of the document 150, and timestamp information indicating the time that the revision was made. In some embodiments, the identification information includes a name corresponding to the editor and an image corresponding to the editor.

At step 610, for each revision entry, the view component 116 may display the text corresponding to each revision entry in a color associated with the editor identified in the revision entry. For example, in FIG. 4A as described above, the view component 116 may display the portion of the sentence 410 corresponding to the revision made by the editor "User1" in one color (e.g. green) and the portion of the sentence 410 corresponding to the revision made by the editor "User2" in another color (e.g. blue). In some embodiments, the text displayed includes text added to the document 150 and not text removed from the document 150.

Figure 7:
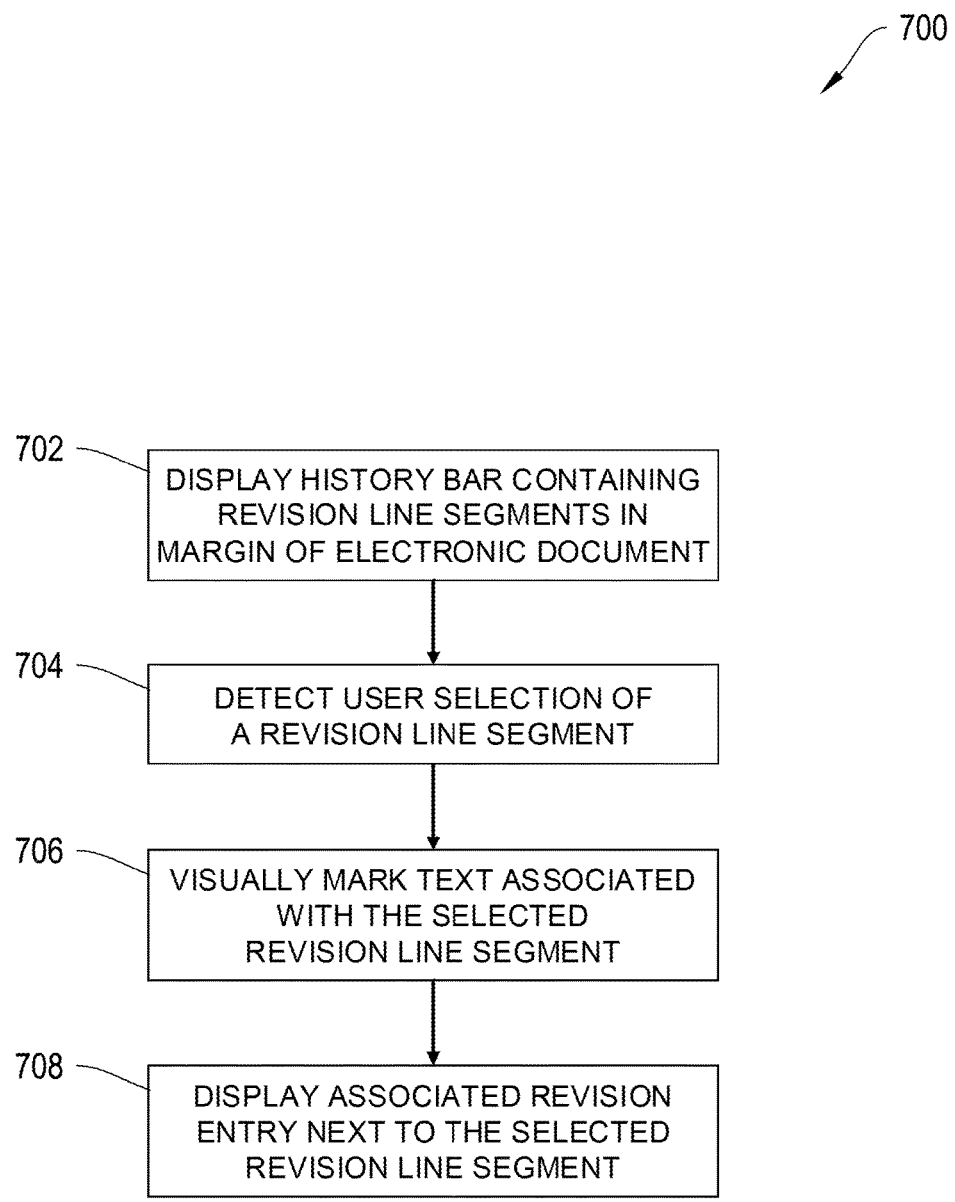
FIG. 7 shows an illustrative process for displaying the revision history information of a section of an electronic document using a revision history bar, according to an embodiment.

FIG. 7 shows an illustrative process for showing the revision history information of a section of an electronic document using a revision history bar. A process 700 may be performed by a system such as the system 100 of FIG. 1. To provide a clear explanation, the process 700 will be described in relation to the system 100 by way of example. The process 700 begins with a step 702. At step 702, the view component 116 displays a vertical line (called a "revision history bar") containing line segments in a vertical margin of a visual display of the document 150. The line segments are revision line segments such as those shown in FIG. 5A. For example, in FIG. 5A, the revision history bar is the revision history bar 515, and the revision line segments are the revision line segments 521 and 531. As mentioned above in the discussion of FIG. 5A, a first end of a revision line segment is aligned vertically with the beginning of the text corresponding to the revision entry associated with the revision line segment. A second end of the revision line segment is aligned vertically with the end of the text. The revision line segment is displayed in the same color as the text, where the color corresponds to the color associated with the editor who made the revision associated with the revision line segment.

At step 704, the context detector 122 detects the user selection of a revision line segment. For example, in FIG. 5A, the user 140 selects a revision line segment by using a mouse pointer to click or hover over a user interface element that the revision line segment contains. Thus, to select the revision line segment 531, the user 140 clicks or hovers over the user interface element 530.

At step 706, the view component 116 may visually mark the text in the document 50 associated with the selected revision line segment. For example, in FIG. 5A, if the user 140 selects the revision line segment 531, then the view component 116 may highlight the sentence 416, which corresponds to the context associated with the revision line segment 531.

At step 708, the view component 116 displays the associated revision entry next to the selected revision line segment. For example, in FIG. 5A, the view component displays the revision entry 532 which corresponds to the context associated with the revision line segment 531.

Figure 8:
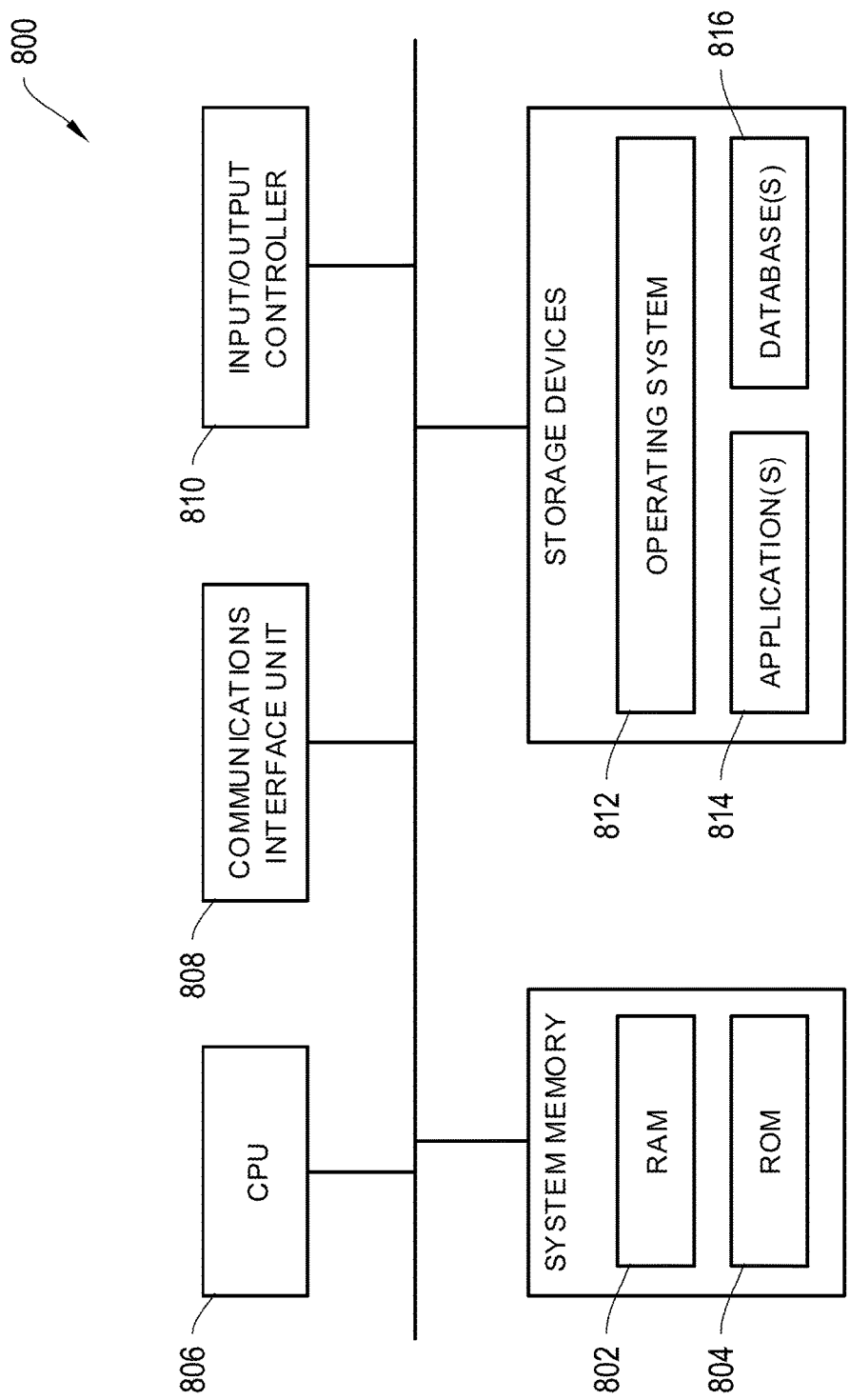
FIG. 8 is a block diagram of a computing device for presenting the revision history information of an electronic document, according to an embodiment.

FIG. 8 is a block diagram of a computing device, such as any of the parts of the system 100 of FIG. 1, for presenting the revision history information of an electronic document. Each of the parts of the system 100, such as the document editor 110, the context revision history process 120, and the revision database 130 may be implemented on one or more computing devices 800. In some implementations the computing devices 800 may be connected over a local area network or over the internet.

The computing device 800 comprises at least one communications interface unit, an input/output controller 810, system memory, and one or more data storage devices. The system memory includes at least one random access memory (RAM 802) and at least one read-only memory (ROM 804). All of these elements are in communication with a central processing unit (CPU 806) to facilitate the operation of the computing device 800. The computing device 800 may be configured in many different ways. For example, the computing device 800 may be a conventional standalone computer or alternatively, the functions of computing device 800 may be distributed across multiple computer systems and architectures. In FIG. 8, the computing device 800 is linked, via network or local network, to other servers or systems.

The computing device 800 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 808 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 806 comprises a processor, such as one or more conventional microprocessors and one or more supplementary co-processors such as math co-processors for offloading workload from the CPU 806. The CPU 806 is in communication with the communications interface unit 808 and the input/output controller 810, through which the CPU 806 communicates with other devices such as other servers, user terminals, or devices. The communications interface unit 808 and the input/output controller 810 may include multiple communication channels for simultaneous communication with, for example, other processors, servers or client terminals.

The CPU 806 is also in communication with the data storage device. The data storage device may comprise an appropriate combination of magnetic, optical or semiconductor memory, and may include, for example, RAM 802, ROM 804, flash drive, an optical disc such as a compact disc or a hard disk or drive. The CPU 806 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 806 may be connected to the data storage device via the communications interface unit 808. The CPU 806 may be configured to perform one or more particular processing functions.

The data storage device may store, for example, (i) an operating system 812 for the computing device 800; (ii) one or more applications 814 (e.g., computer program code or a computer program product) adapted to direct the CPU 806 in accordance with the systems and methods described here, and particularly in accordance with the processes described in detail with regard to the CPU 806; or (iii) database(s) 816 adapted to store information that may be utilized to store information required by the program. The one or more applications 814 may include the document editor 110 and the context revision history process 120. The database 816 may include the revision history database 130.

The operating system 812 and applications 814 may be stored, for example, in a compressed, an uncompiled and an encrypted format, and may include computer program code. The instructions of the program may be read into a main memory of the processor from a computer-readable medium other than the data storage device, such as from the ROM 804 or from the RAM 802. While execution of sequences of instructions in the program causes the CPU 806 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to aligning dietary behavior as described herein. The program also may include program elements such as an operating system 812, a database management system and "device drivers" that allow the processor to interface with computer peripheral devices (e.g., a video display, a keyboard, a computer mouse, etc.) via the input/output controller 810.

The term "computer-readable medium" as used herein refers to any non-transitory medium that provides or participates in providing instructions to the processor of the computing device 800 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 806 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 800 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various implementations have been shown and described herein, it will be obvious to those skilled in the art that such implementations are provided by way of example only. Numerous variations, changes, and substitutions will now occur to those skilled in the art without departing from the present disclosure. It should be understood that various alternatives to the implementations described herein may be employed. It is intended that the following claims define the scope of the present disclosure and that methods and structures within the scope of these claims and their equivalents be covered thereby.

What is claimed is:

1. A method of presenting revision history information of an electronic document, compromising:
    retrieving an electronic document stored as a hierarchical structure of objects,
    each object from the hierarchical structure of objects is stored with revision history information;
    displaying the electronic document via a user interface;
    detecting a selection of a section of the electronic document from the user interface;
    associating at least a portion of the selected section with an object from the hierarchical structure of objects;
    retrieving revision history information associated with the object;
    presenting the revision history information within the displayed electronic document via a visual indicator element on the user interface;
    wherein the visual indicator element indicates a beginning position and an ending position of the selected section of the document, and the visual indicator element includes a selectable button that is configured to be moved vertically by a user, and to display a tag next to the selectable button showing the revision history information when the selectable button is moved to be horizontally aligned with a position of the at least one portion of the selected section of the document and the portion of the selected section corresponds to the object; and
    wherein the revision history information comprises identification information identifying an editor having made a revision to the object, and timestamp information indicating a time that the revision was made.

2. The method of claim 1, further comprising:
in response to detecting the selection of the section of the electronic document, displaying a first menu having a command to display a subset of the revision history information of the electronic document, the subset including revision history information corresponding to the object and omitting revision history information unassociated with the object.

3. The method of claim 2, further comprising:
in response to detecting the selection by the user of the command to display the subset of the revision history information of the electronic document, displaying via a second menu expanded from the first menu a list having a revision entry associated with a revision to the object.

4. The method of claim 1, wherein the identification information includes a name corresponding to the editor and an image corresponding to the editor.

5. The method of claim 1, wherein the identification information is displayed in a color associated with the editor.

6. The method of claim 5, wherein the tag is displayed in the color associated with the editor.

7. The method of claim 6, further comprising:
displaying, in a vertical margin of a visual display of the electronic document, a vertical line having a segment, wherein:
a first end of the segment is aligned vertically with a beginning of the text corresponding to the revision entry;
a second end of the segment is aligned vertically with an end of the text, and the segment is displayed in the color of the text.

8. The method of claim 7, wherein the first end of the segment comprises a user interface configured to be selected by the user.

9. The method of claim 8, further comprising:
detecting a selection by the user of the first end of the segment; and
in response to detecting the selection of the first end of the segment, displaying the revision entry next to the first end of the segment.

10. A system for presenting revision history information of an electronic document, compromising:
a memory;
a processor configured to:
retrieve an electronic document stored as a hierarchical structure of objects, each object from the hierarchical structure of objects is stored with revision history information;
display the electronic document via a user interface;
detect a selection of a section of the electronic document from the user interface;
associate at least a portion of the selected section with an object from the hierarchical structure of objects;
retrieve revision history information associated with the object;
present the revision history information within the displayed electronic document via a visual indicator element on the user interface;
wherein the visual indicator element indicates a beginning position and an ending position of the selected section of the document, and the visual indicator element includes a selectable button that is configured to be moved vertically by a user, and to display a tag next to the selectable button showing the revision history information when the selectable button is moved to be horizontally aligned with a position of the at least one portion of the selected section of the document and the portion of the selected section corresponds to the object; and
wherein the revision history information comprises identification information identifying an editor having made a revision to the object, and timestamp information indicating a time that the revision was made.

11. The system of claim 10, wherein the processor is further configured to:
in response to detecting the selection of the section of the electronic document, display a first menu having a command to display a subset of the revision history information of the electronic document, the subset including revision history information corresponding to the object and omitting revision history information unassociated with the object.

12. The system of claim 11, wherein the processor is further configured to:
in response to detecting the selection by the user of the command to display the subset of the revision history information of the electronic document, display via a second menu expanded from the first menu a list having a revision entry associated with a revision to the object.

13. The system of claim 10, wherein the identification information includes a name corresponding to the editor and an image corresponding to the editor.

14. The system of claim 10, wherein the identification information is displayed in a color associated with the editor.

15. The system of claim 14, wherein the tag is displayed in the color associated with the editor.

16. The system of claim 15, wherein the processor is further configured to:
display, in a vertical margin of a visual display of the electronic document, a vertical line having a segment, wherein:
a first end of the segment is aligned vertically with a beginning of the text corresponding to the revision entry;
a second end of the segment is aligned vertically with an end of the text, and the segment is displayed in the color of the text.

17. The system of claim 16, wherein the first end of the segment comprises a user interface configured to be selected by the user.

18. The system of claim 17, wherein the processor is further configured to:
detect a selection by the user of the first end of the segment; and
in response to detecting the selection of the first end of the segment, display the revision entry next to the first end of the segment.

19. A non-transitory computer medium comprising instructions, which when executed by a processor, cause the processor to perform operations comprising:
retrieving an electronic document stored as a hierarchical structure of objects, each object from the hierarchical structure of objects is stored with revision history information;
displaying the electronic document via a user interface;
detecting a selection of a section of the electronic document from the user interface;
associating at least a portion of the selected section with an object from the hierarchical structure of objects;
retrieving revision history information associated with the object;

presenting the revision history information within the displayed electronic document via a visual indicator element on the user interface;

wherein the visual indicator element indicates a beginning position and an ending position of the selected section of the document, and the visual indicator element includes a selectable button that is configured to be moved vertically by a user, and to display a tag next to the selectable button showing the revision history information when the selectable button is moved to be horizontally aligned with a position of the at least one portion of the selected section of the document and the portion of the selected section corresponds to the object; and wherein the revision history information comprises identification information identifying an editor having made a revision to the object, and timestamp information indicating a time that the revision was made.

* * * * *